Figure 1:
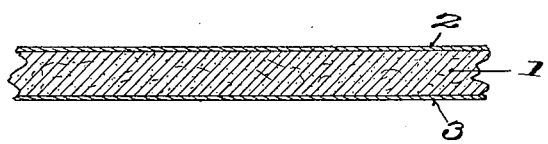

May 3, 1932. J. T. BALDWIN 1,856,370

SMOOTH SURFACED FLOOR COVERING

Filed Oct. 29, 1926

Julian T. Baldwin

Prentiss, Stone & Boyden

Attorney

Patented May 3, 1932

1,856,370

UNITED STATES PATENT OFFICE

JULIAN T. BALDWIN, OF WEST CHESTER, PENNSYLVANIA, ASSIGNOR TO SANDURA COMPANY, INC., OF PHILADELPHIA, PENNSYLVANIA, A CORPORATION OF NEW JERSEY

SMOOTH SURFACED FLOOR COVERING

Application filed October 29, 1926. Serial No. 145,002.

This invention relates to an improvement in smooth-surfaced floor coverings and to coatings therefor.

A new floor covering is provided, consisting of a supporting base coated on its upper and lower sides with a composition having certain desirable properties such as flexibility, toughness, durability, smoothness, and a high resistance to the alkalies and soaps used for cleaning purposes.

The coating on the upper side, namely, the wear or decorative coat, presents the printed design, or it may be a coating devoid of design, such as a monochrome. This decorative layer is ordinarily an oil paint or an enamel and requires from five to seven days to harden sufficiently for use. Even when dried, the oil in the paint renders it susceptible to attack by the strong alkalies used in soaps for floor cleaning.

The coating on the lower side, namely, the backing layer, is used to hide the unsightly backs of supporting bases such as felt saturated with bitumen or the burlap of linoleum.

The compositions employed in the decorative layer and in the backing layer, consist broadly of resins natural or synthetic, plasticizers, optionally modifiers, and pigments and dyes of various kinds.

Examples of resins employed are: acaroides gum, rosin, Manila copal, shellac, cumar, ester gum and the like. Synthetic resins such as phenol-formaldehyde resins and urea resins may also be used. It is to be understood that by resin is meant a true resin as technically distinguished from a gum. A true resin, for instance, is insoluble in water, whereas a gum is soluble in water.

Plasticizers are substances or mixtures of substances which apparently form a permanent gel or state of solution with resins. When a plasticizer is mixed with a resin, the resulting composition is generally considered to be a solution of the resin in the plasticizer, the plasticizer being the external phase. It is desirable in the present case to have the placticizer as the internal phase or in solution in the resin. The solution is probably not a true solution but a gel, or a dispersion of plasticizer in the resin.

Plasticizers are generally liquid and have practically no vapor pressure at ordinary temperatures (70° F.). They are sometimes spoken of as high boiling point solvents for resins, their boiling points ranging not much below 300° C.; they are chemically stable; free from tackiness; and impart to the resins the important properties of flexibility, toughness, impermeability, durability and smoothness of surface. Examples of plasticizers are: diethyl phthalate, dibutyl phthalate, diamyl phthalate, dibutyl tartrate, triphenyl phosphate, and tricresyl phosphate.

Modifiers are substances which impart such desirable properties as hardness, elasticity, and resistance to wear. They also serve as cheapeners and are used only optionally. Examples of modifiers are: waxes (such as Montan wax), rubber, fatty acids of vegetable oils, polymerized oils, drying oils such as tung oil, and hydrocarbons such as spinacene and squalene.

The use of volatile solvents is optional, depending upon the manner of applying the coats. Examples of solvents are: ethyl alcohol preferably denatured, benzol, toluol, naphtha, and the like.

The following is a general formula for a decorative wear coat:—

| | Parts by weight |
|---|---|
| Resins | 100 |
| Plasticizer | 35 |
| Modifier | 5–15 |
| Pigment | 100–200 |
| Solvent (if used) | 100 |

When a solvent is used, the composition may be applied by means of the regular flat-bed or rotary printing machines or by hand blocks in the same way that oil paints are usually applied. A solvent recovery system may be used to recover the solvents. The use of a solvent may be done away with by softening the composition by heat and using the above mentioned machines with heated metal printing blocks, heated rollers, heated paint carriages and troughs.

Examples of specific formulas used for decorative wear coats are as follows:—

| | Parts by weight |
|---|---|
| Ester gum | 100 |
| Dibutyl phthalate | 20 |
| Heavy bodied linseed oil | 15 |
| Pigments and fillers | 135 |

The above mixture is applied with heat as the flow producing agent. When used with solvent the following may be added:—

| | Parts by weight |
|---|---|
| Xylol | 50 |
| Solvent naphtha | 50 |

The amount of solvent used depends on the consistency desired. Altering the quantity of pigment and filler changes the consistency but also changes the properties of the coating.

The following is a general formula for a backing layer:

| | Parts by weight |
|---|---|
| Resins | 100 |
| Plasticizer | 30 |
| Modifier | 5 |
| Solvent (if used) | 100 |
| Pigments and mineral fillers | 100 to 350 |

After the decorative layer has been applied and thoroughly dried, a composition of the above type is applied to the backing. It may be applied hot without the use of solvents by means of a heated transfer roller, heated squeeze rollers, a doctor blade or by any other appropriate means. When solvents are used, the same machinery can be used, but heat need not be applied.

Examples of specific formulas used for backing coats are as follows:—

I

| | Parts by weight |
|---|---|
| Acroides gum | 100 |
| Diamyl phthalate | 25 |
| Pigment and mineral filler | 200 |
| 188 proof denatured ethyl alcohol | 100 |

II

| | Parts by weight |
|---|---|
| Rosin | 100 |
| Tricresyl phosphate | 30 |
| Montan wax | 10 |
| Pigments and fillers | 200 |
| Toluol (optional) | 150 |

Without the solvent, this formula is primarily for application by means of heat.

The resin-plasticizer compositions described above, when used in the wear coat, besides being less subject to attack by the alkalies in soaps than are oil paints and enamels, dry in a much shorter time. Only a few minutes are required when heat is used, and a few hours when solvents are used, as compared with five to seven days for oil paints.

The compositions used in the invention also have a number of advantages over cellulose ester compositions. First of all, they are less inflammable. Then they are more easily applied with heat without the use of solvents since they soften at much lower temperatures. Resins can be softened without harmful decomposition taking place, while cellulose esters, especially pyroxylin, tend to decompose before softening. When solvents are used, a much higher concentration of resin may be obtained than with pyroxylin for the same viscosity. The concentration of solids in a resin solution may often be ten times as great as in a cellulose ester solution of the lowest viscosity. This results in a very large saving in the cost of solvents required to convey a given quantity of solids to the surface to which the solutions are applied.

Cheaper solvents can be used with resins than with cellulose esters. Solvent naphtha, benzol, and 188 proof denatured alcohol are the most important resin solvents. Esters, which are many times more expensive, are quite necessary for the solution of cellulose esters. Due to the greater affinity of resins for solvents, the solvents leave the resins at a slower rate than they leave cellulose ester solutions, and expensive slow evaporating solvents need not be used to such an extent with resins as with cellulose esters. This is important when applying designs by machine because a rapidly drying paint clogs up the designs on the printing blocks. Resin paints have been successfully used on machines. The lower viscosity of resin solutions give a much better working consistency than the high viscosity of cellulose ester solutions.

A resin-plasticizer composition such as that of the present invention makes a better wearing surface than cellulose ester paints due to the fact that the wear is apparently proportional to the pigment content. Cellulose ester paints for this purpose often contain but 5% of the solids as pigment and seldom over 35%, and the usual oil paint now used contains from 50 to 70% of the solids as pigments, while resin-plasticizer compositions may contain from 40 to 70% of the solids as pigment. For this reason, also, a resin-plasticizer coating is very desirable for backing layers since they have very good hiding qualities.

A resin-plasticizer composition will produce a higher gloss than a cellulose ester composition when applied over a highly pigmented surface such as the economical backing mentioned above, due to the lower absorption of resin by the pigments. It has been observed that when a cellulose ester such as pyroxylin is used as a vehicle for pigment, a quantity of pigment above twenty-five per cent by weight of solids in the pyroxylin solution gives a very dull and brittle paint, while in the case of resin solutions, quantities of pigment up to seventy per cent of the solid content may be used.

A diagrammatic representation of the finished floor covering is shown in the accompanying drawing, which is enlarged about five times. Fig. 1 shows a supporting base 1, such as a bitumen saturated felt, coated on the top with a pigmented resin plasticizer composition 2 which serves as a decorative or wear coat, and on the bottom with a pigmented resin plasticizer composition 3 which serves as a backing layer. A transparent wear coat may be applied over a decorative coat if desired as shown by numeral 5 in Fig. 2. The coatings may be applied in any order.

In the use of a transparent wear coat over a resin-plasticizer composition, a novel feature is that the wear coat may be applied to the resin-plasticizer with a solvent similar to that employed in applying the resin plasticizer composition. When this is done to an oil paint, the paint lifts or wrinkles, and becomes greatly distorted, especially if the paint is not completely hardened. By using mutual solvents, the transparent coat and the resin-plasticizer coat are made homogeneous. Lifting will not take place, for one reason, because both coats dry at the same rate and to the same degree. A transparent wear coat may be applied to the resin-plasticizer immediately after the latter is applied, while with oil paints such an application would either destroy the paint or prevent the oil in the paint from being oxidized as rapidly as if the transparent coat had not been applied, or both evils might result.

Figure 2:
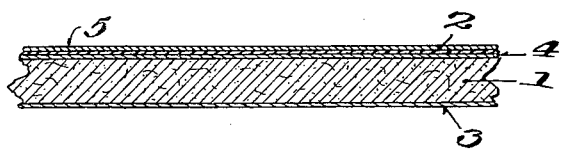

Fig. 2 shows the use of a so-called facing layer 4 which may be applied between a decorative coat 2 and the supporting base 1. It may be a resin plasticizer composition with or without pigment, or some oil coating. The purpose of the facing layer is to give a smooth surface upon which to print the decorative coat, and to prevent a worn spot in the decorative coat or a slight defect in the printing of the decorative coat from showing an unsightly base, such as a bitumen saturated felt base. It would not be needed quite as much in the case of linoleum bases. This facing layer also keeps the bitumen from discoloring paints in the decorative coat.

All three layers may be resin plasticizer compositions or any one of them alone, or any two of them. The coatings which do not contain a resin plasticizer composition may be any of the usual oil paints or other coatings, although, as stated before, in cases where one coating is applied to another, the best results are obtained where the coatings are resin plasticizer compositions, or where the coatings contain mutual solvents. Either the facing coat or the backing coat may be applied first, or where resin plasticizer compositions are used, the facing and backing may be applied simultaneously. This saves an extra operation.

Claims to the resin and plasticizer composition as such are presented in my copending application Serial No. 138,897, filed October 1, 1926.

The resin plasticizer material described in this invention as the coating of a supporting sheet carrying the same is also described and claimed as the saturant of an impregnated sheet in my copending application Serial No. 159,917, filed Jan. 8, 1927.

What I claim is:—

1. A floor covering consisting of a supporting base; a decorative coat on one side of said base, the said coat including ester gum, dibutyl phthalate and pigments; and a coating on the other side of said base including acroides gum, diamyl phthalate, and pigments.

2. A floor covering comprising a supporting base and coatings on both sides of said base, each of said coatings having as its two major ingredients a resin and a substantially chemically stable plasticizer for the resin.

3. A floor covering comprising a supporting base, a facing coat on one side of said base, a backing layer on the other side of said base, and a decorative coat on said facing coat, said decorative coat being free from tackiness and having as its two major ingredients a resin and a dispersion of a substantially chemically stable plasticizer in the resin, and secondarily coloring matter.

4. A floor covering comprising a supporting base, a facing coat on one side of said base, a backing layer on the other side of said base, and a decorative coat on said facing coat, said facing coat having as its two major ingredients a resin and a substantially chemically stable plasticizer for the resin, the proportions being not less than 20 parts nor more than 35 parts of plasticizer to each 100 parts of resin.

5. A floor covering comprising a supporting base, a facing coat on one side of said base, a backing layer on the other side of said base and a decorative coat on said facing coat, the said backing layer being free from tackiness and having as its two essential ingredients a resin and a substantially chemically stable plasticizer for the resin, the proportions being not less than 20 parts nor more than 35 parts of plasticizer to each 100 parts of resin.

In testimony whereof I affix my signature.

JULIAN T. BALDWIN.